Patented July 9, 1929.

1,720,596

UNITED STATES PATENT OFFICE.

HERBERT E. GRIER, OF BROOKLYN, NEW YORK, ASSIGNOR, BY MESNE ASSIGNMENTS, TO R. H. COMEY BROOKLYN COMPANY, INC., OF BROOKLYN, NEW YORK, A CORPORATION OF NEW YORK.

PROCESS OF DYEING.

No Drawing. Application filed November 16, 1926. Serial No. 148,776.

This invention relates to a process of dyeing and has particular reference to the dyeing of articles or materials which cannot be satisfactorily treated with an aqueous dye solution. It is well-known that certain materials or articles when treated with an aqueous dye solution tend to lose their shape or texture and become soft and flimsy or mushy, or undergo other detrimental changes in their physical form or structure. The difficulties connected with the dyeing of such materials is well-known and has been the subject of extensive study, and the use of alcohols, benzene and other carriers for the dyes has been tried without very satisfactory results. The present invention aims to provide a process by which articles or materials of the kind mentioned can be successfully dyed without undergoing the detrimental physical changes above mentioned. More specifically the present invention aims to provide a process for the dyeing of articles or materials such as loosely woven paper cloth or articles made of loosely woven paper, such as paper hoods, and similar materials. It has particular reference to the dyeing of straw or straw braids or woven hats made of straw or other vegetable fiber which tend to become soft and lose their shape, and undergo the objectionable changes above mentioned.

In carrying out my invention I preferably treat the articles to be dyed with a solution containing a dissolved wax, a dissolved resin and a suitable dye to give the color or shade desired. In some cases a solution of wax and dye without the resin may be employed and this is covered by my copending application Serial No. 148,775 filed November 16, 1926. Also it may be found desirable in some cases to employ a solution containing only the resin and dye. As a rule, however, I prefer to use both wax and resin solution with the dye.

In preparing the wax and resin solution I may employ various kinds of waxes and resins and also various solvents. Or it may be found desirable in some cases to use a mixture of waxes or resins. It is of course necessary to employ a solvent which will dissolve the particular wax and resin selected. In preparing the wax and resin solution I have found either of the following to give satisfactory results:

1. Dissolve 300 grams of Japan wax and 300 grams of gum dammar in about 5 liters of benzol; heat to solution.
2. Dissolve 300 grams of carnauba wax and 300 grams of gum dammar in about 5 liters of xylene; heat to solution.

It is of course obvious that the wax and the resin may be dissolved separately and the solutions afterwards mixed, preferably in substantially equal proportions.

After the wax and resin solution is obtained I add thereto or mix therewith a suitable amount of a dye or coloring matter to produce a dyeing solution of the proper strength or concentration. It is of course necessary to select a dye or coloring matter which will give the color or shade desired. As coloring materials oil colors may be employed or if desired anilin dyes may be used.

After the solution containing the dye is thus prepared, the materials or articles to be dyed are preferably immersed in the same for a short time, usually a few minutes, and are then removed, and after the adhering material has dripped off the articles are dried. In the case of straw or similar hats it has been found desirable to immerse the same in a nested condition in the dyeing solution. Such hats after being woven and while in the rough state before being shaped can be easily nested together, and it has been found that a number of such hats loosely nested together can be immersed in the dyeing solution at the same time. Due to the loosely woven character of the hats and the loose nesting of the same the solution can penetrate to all parts of the same.

I have found that with the foregoing procedure the dissolved wax and resin along with the dye material penetrates to a considerable extent the article being treated. In other words, the solvents employed are good penetrators and as they penetrate the fibers of the material being treated, the wax and resin as well as the dye are more or less carried into and incorporated with the fiber. The incorporated dye, of course, gives the treated material the desired color. The wax serves principally to give "body" or weight to the fibrous material so that it will retain its shape and not become soft and mushy and flimsy. In addition the wax gives to the treated articles a smooth feel and appearance. The resin also serves to some extent to give "body" to the treated material but it also serves to give it luster or a glossy appearance. In some cases it may be found unnecessary to use wax, as the solution of resin alone with the dyeing material will give the desired "body" to the treated articles and prevent them from losing shape and becoming soft and flimsy. When this is done it will generally be found desirable to increase the amount of resin used in making the resin solution.

I have found that with the foregoing procedure articles made of fibrous materials such as straw braid, straw hats, paper articles, etc., which tend to become soft and lose their shape when subjected to aqueous dye solutions, can be successively treated and that the dyed material will possess good "body" and weight and retain its shape and possess a lustrous and glossy finish.

In carrying out my process, the step of applying the dye may be performed after the articles have been subjected to the wax and resin solution, that is, the process may be carried out in two separate steps instead of one, although I prefer to mix the dye with the wax and resin solution and carry out the process in a single step.

Having thus described the invention, what is claimed as new and desired to be secured by Letters Patent is:

1. The process of dyeing fibrous articles without injuriously affecting their physical form or structure which consists in forming a solution containing a wax, a resin and a dyeing material, and covering the articles with such solution.

2. The process of dyeing fibrous articles without injuriously affecting their physical form or structure which consists in immersing the articles in a solution containing a wax, a resin and a dyeing material.

3. The process of dyeing fibrous articles without injuriously affecting their physical form or structure which consists in forming a solution containing a resin and a dyeing material, and covering the articles with such solution.

4. The process of dyeing articles of straw which consists in immersing them in a solution containing a wax and a resin and a dyeing material.

5. The process of dyeing fibrous articles without injuriously affecting their physical form or structure which consists in covering them with a dissolved wax, a dissolved resin and a dyeing material.

6. The process of dyeing fibrous articles without injuriously affecting their physical form or structure which consists in covering the articles with a solution containing gum dammar and a dyeing material.

7. A solution for the immersion and dyeing of fibrous articles comprising wax, resin and a dyeing material.

8. A dyeing solution comprising wax, gum dammer and a dyeing material.

9. A dyeing solution comprising Japan wax, gum dammar and a dyeing material.

10. The process of dyeing fibrous loosely woven articles which tend to become soft and to lose their shape when wet without injuriously affecting their physical form or structure, which comprises immersing the articles in a solution containing gum dammar and a dyeing material.

11. The process of dyeing fibrous loosely woven articles which tend to become soft and to lose their shape when wet without injuriously affecting their physical form or structure, which comprises immersing the articles in a solution containing gum dammar, Japan wax, and a dyeing material.

In testimony whereof I hereunto affix my signature.

HERBERT E. GRIER.